United States Patent
Du (10) Patent No.: US 7,231,427 B1
(45) Date of Patent: Jun. 12, 2007

(54) E-MAIL PROTOCOL USING ASSUMED SEND AND REPLY ADDRESS AND SMART E-MAIL ARCHIVING BY ADDRESSEE AND ADDRESSOR

(76) Inventor: Qiang Du, 707 Continental Cir. #1511, Mountain View, CA (US) 94040

( * ) Notice: Subject to any disclaimer, the term of this patent is extended or adjusted under 35 U.S.C. 154(b) by 796 days.

(21) Appl. No.: 09/956,512

(22) Filed: Sep. 18, 2001

Related U.S. Application Data (60) Provisional application No. 60/316,377, filed on Aug. 30, 2001.

(51) Int. Cl.
G06F 15/16 (2006.01)
G06F 17/40 (2006.01)

(52) U.S. Cl. .................... 709/206; 709/245

(58) Field of Classification Search ........... 709/206, 709/245, 246
See application file for complete search history.

(56) References Cited

U.S. PATENT DOCUMENTS

| | | | |
|---|---|---|---|
| 5,752,059 | A | 5/1998 | Holleran et al. |
| 5,930,479 | A * | 7/1999 | Hall ............................ 709/238 |
| 6,029,164 | A | 2/2000 | Birrell et al. |
| 6,052,709 | A | 4/2000 | Paul |
| 6,185,551 | B1 | 2/2001 | Birrell et al. |
| 6,205,471 | B1 | 3/2001 | Gilchrist et al. |
| 6,438,583 | B1 * | 8/2002 | McDowell et al. ......... 709/206 |
| 6,449,657 | B2 * | 9/2002 | Stanbach et al. ........... 709/245 |
| 6,591,291 | B1 * | 7/2003 | Gabber et al. ............... 709/206 |
| 6,592,627 | B1 * | 7/2003 | Agrawal et al. ............. 715/513 |
| 6,851,049 | B1 * | 2/2005 | Price, III .................... 713/150 |
| 6,892,222 | B2 * | 5/2005 | McDowell et al. ......... 709/206 |
| 6,952,769 | B1 * | 10/2005 | Dubey et al. ............... 713/153 |
| 7,054,906 | B2 * | 5/2006 | Levosky ...................... 709/206 |
| 7,058,683 | B1 * | 6/2006 | Belissent et al. ........... 709/206 |
| 7,120,927 | B1 * | 10/2006 | Beyda et al. ................... 726/2 |
| 2001/0047406 | A1 * | 11/2001 | Araujo et al. ................ 709/223 |
| 2001/0049745 | A1 * | 12/2001 | Schoeffler .................... 709/238 |
| 2002/0046250 | A1 * | 4/2002 | Nassiri ........................ 709/206 |
| 2005/0132072 | A1 * | 6/2005 | Pennell et al. .............. 709/228 |
| 2006/0010214 | A1 * | 1/2006 | McDowell et al. ......... 709/206 |
| 2006/0026438 | A1 * | 2/2006 | Stern et al. .................. 713/184 |
| 2007/0011245 | A1 * | 1/2007 | Kawashima et al. ........ 709/206 |

OTHER PUBLICATIONS

Helmers, Sabine; "A Brief History of anon.penet.fi—The Legendary Anonymous Remailer"; 1997, *CMC Magazine*, http://www.december.com/cmc/mag/1997/sep/helmers.html.html, 5 pages.

(Continued)

*Primary Examiner*—Andrew Caldwell
*Assistant Examiner*—Douglas Blair
(74) *Attorney, Agent, or Firm*—Townsend and Townsend and Crew LLP (57) ABSTRACT

In an E-mail protocol between a sender and a receiver, an intermediate server subscribed to by either the sender or receiver assures masking of the primary E-mail address of a subscriber in E-mail messages between sender and receiver. The protocol also archives all messages passing through the intermediate server for the subscribing sender and/or receiver by addressee.addresses.

10 Claims, 7 Drawing Sheets

OTHER PUBLICATIONS

Lodge-Atchison, Devon A. et al.; "Internet Privacy through Anonymity: Encryption's Desirable and Dangerous Sister"; 1997, *George State University College of Law*, http://gsulaw.gsu.edu/lawand/papers/sp97/anon1.html, 7 pages.

Strassmann, Paul A. et al.; "Risk-Free Access Into The Global Information Infrastructure Via Anonymous Re-Mailers"; 1996, *Harvard University*, http://www.fitug.de/bildung/anon-remail.html, 9 pages.

* cited by examiner

E-MAIL PROTOCOL USING ASSUMED SEND AND REPLY ADDRESS AND SMART E-MAIL ARCHIVING BY ADDRESSEE AND ADDRESSOR

CROSS-REFERENCES TO RELATED APPLICATIONS

This application claims priority from Provisional Patent Application Ser. No. 60/316,377, filed Aug. 30, 2001 entitled E-mail protocol using assumed send and reply address and smart E-mail archiving by addressee and addressor. This patent application is incorporated by reference as if fully set forth herein.

BACKGROUND OF THE INVENTION

This invention relates to E-mail. Specifically, the disclosed protocol uses an assumed E-mail address to mask and/or maintain confidential the specific address of a subscriber, so long as the sender or the receiver is system subscriber.

E-mail services are known under the common name of "remailers", which enable messages to be sent with anonymity. Reply is a different matter. These services typically do not allow for reply on an anonymous basis.

Other so-called E-mail services are known which require access to a remote server site. Once the user is on the remote server site, massages are sent and received from that remote site. The reader will understand in reading what follows, the E-mail protocol proposed hereafter does not require access to the remote server site to send and receive messages. Rather, in the process that follows, where either the sender or the receiver of E-mail is a system subscriber, mail is forwarded by the disclosed protocol through an intermediate server. It is not required that the system subscriber logon to the intermediate server for message transmission to occur.

Finally, it is known in certain E-mail services—such as certain "match making" services—to maintain confidentiality of real E-mail addresses between E-mail corresponding parties. In these cases, both parties must belong to the same E-mail service. It is not possible for just one party to use the service and maintain the desired secrecy of their primary E-mail address.

The reader will understand that the discovery of a need can constitute invention. I have discovered that there is a need for an E-mail service where the sender, or the receiver of E-mail can have their primary E-mail address maintained confidential or assume a specific identity. A system subscriber can send and receive E-mails in a specific identity without logon to the system. In what follows I disclose such a protocol, which has the additional advantage of permitting smart archiving of incoming and outgoing E-mails in folders related to all E-mail correspondents of a subscriber. Smart archiving of previous or existing E-mails forwarded from other E-mail systems is also included.

In the Specification that follows I will refer to a subscriber's E-mail address as being the "primary E-mail address" of the user. Further, I will refer to the protocol as providing an "assumed E-mail address." This assumed E-mail address is that E-mail address in the disclosed protocol to which sending and reply is encouraged; using the assumed E-mail address and the protocol here proposed, the primary E-mail address remains hidden or confidential.

Additionally, in the specification that follows I use the term "delimiter". This is a term of the computer art, which is defined as A character or sequence of characters marking the beginning or end of a unit of data. Examples of such delimiter can include "@", "." (that is period), "%", and other indicia commonly recognized by software as indicating the beginning or end of a unit of data.

BRIEF SUMMARY OF THE INVENTION

An E-mail protocol uses an assumed E-mail address to mask and/or maintain confidential the primary address of a subscriber, so long as the sender or the receiver is system subscriber. Messages have "to" and "from" addressing in the format (john02@university.edu) with a user identifier (e.g. john02), a delimiter, here in the form of a user identifier sign (e.g. @), and domain name in the format name type (e.g. university.edu). An assumed E-mail address consists of a user identifier sign, an intermediate server domain name and a user identifier, which can be different from the one in the primary E-mail address.

Presuming a subscriber (susan) wishes to send an E-mail to a non-subscribing party (john) for the first time, the delimiter and intermediate server domain name (e.g. @storagemail.com or ".storagemail.com") is concatenated to the end of the receiver's original domain name before transmission. If user identifier sign (e.g. @ and intermediate server domain name are used, the receiver' user identifier sign (@[which in reality is a delimiter] is substituted with another delimiter (e.g. %). This leaves the receiver's address in the format john02%university.edu@storagemail.com or john02@university.edu.storagemail.com. The E-mail is thus addressed to the intermediate server. Provision can be made for the substitution of the entire E-mail address.

Another way to view this address is to remember its format phrased in terms of "delimiters." When this format is phrased in terms of delimiters, the format becomes:

john02[delimiter]university[delimiter]edu[delimiter]storagemail[delimiter]com[end of address]. It is not important to this invention what form of delimiter is used. Following the examples of this specification, many forms of delimiters can be utilized. It is only important that these delimiters when parsed by modern E-mail routing system end up addressed to the correct E-mail destination.

Upon receipt at the intermediate server, an archive folder is created with the receiver's E-mail address and a copy of the E-mail archived therein. The message is resent from the intermediate server to the intended receiver.

Upon resending, the sender's primary E-mail address is removed and sender's assumed E-mail address is used (susan01@storagemail.com). Receipt occurs with the primary E-mail address being maintained confidential "reply to" address is in the usual format (susan01@storagemail.com).

Presuming a non-subscriber (john) wishes to send an E-mail to a subscriber (susan). The E-mail is thus addressed to the intermediate server. Provision can be made for the substitution of the entire E-mail address.

Upon receipt at the intermediate server, an archive folder is opened or created with the sender's E-mail address and a copy of the E-mail archived therein. The message is resent from the intermediate server to the intended receiver.

Upon receipt at the intermediate server, the receiver's assumed E-mail address is removed and receiver's primary E-mail address is used in the usual format (susan02@realemail.com). "Reply to" address automatically changes to john02%university.edu@storagemail.com or john02@university.edu.stroagemail.com. Other substitutions can be made within the scope of the delimiter example outline above.

Upon an original message from a sender to the assumed E-mail address of a subscribing receiver, the message is receiver at the intermediate server. Presuming there are previous messages from the sender to the subscribing receiver, an archive folder of the addressee is opened with sender's E-mail address and copy maintained. The intermediate server strips the assumed E-mail address, restores the primary E-mail address of the receiver, and forwards the message. Subsequent E-mails between the parties are archived in the created folder and forwarded with an identical protocol. There results an E-mail service assuring confidentiality of the primary E-mail address and providing archiving by addresses for convenient review of messages.

The system allows for the forwarding of past or pre-subscription E-mails. The forwarded E-mails are archived and directly accessed by the system and treated conventionally as set forth immediately above.

The protocol also allows the subscriber to have multiple primary E-mail addresses, archiving E-mails according to primary E-mail addresses and routing incoming E-mail to one of multiple primary E-mail addresses.

DETAILED DESCRIPTION OF THE INVENTION

Figure 1:
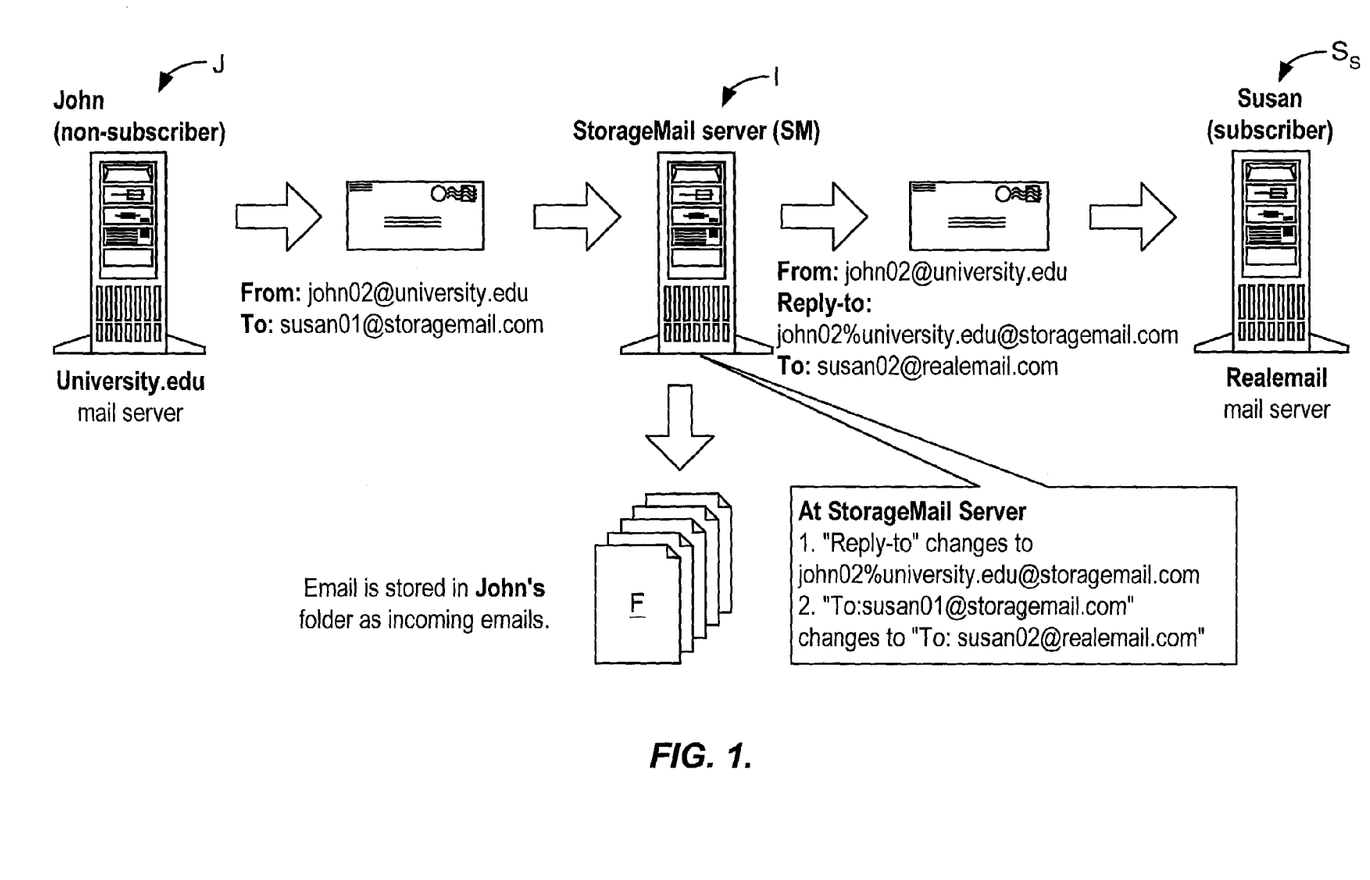
FIG. 1 is a schematic of the E-mail system wherein a non-subscribing sender sends an E-mail to the subscribing receiver's assumed E-mail address through the intermediate server and the server alters the "reply to" address and change the receiver's address upon transmission to assure the E-mail delivery masking of the primary E-mail address of the subscribing receiver.

Referring to FIG. 1, non-subscribing sender J sends E-mail E to subscribing receiver $S_S$ through intermediate server I. Non-subscriber sender J has obtained the assumed E-mail address of subscribing receiver $S_S$ from other sources, for example WebPages. Subscribing receiver $S_S$ wants to receive non-subscribing sender J's E-mail; subscribing receiver $S_S$ does not want sender J to know her real E-mail address.

The E-mail is from non-subscriber john02@university.edu to susan01@storagemail.com with "susan01" being the user identifier, @ being the user identifier sign, and storagemail.com being the domain name of the intermediate server. For the purposes of this specification, these individual components of E-mail addresses will not be given nomenclature hereafter.

The E-mail is addressed to the subscribing receiver $S_S$ at intermediate server I. This E-mail is resent from intermediate server I with both the "to" and the "reply to" addresses changed.

First, the subscribing receiver $S_S$ E-mail address is changed. It is changed from its assumed E-mail address to its primary E-mail address at server I.

Second, the possibility of a reply has to be anticipated. Should subscribing receiver $S_S$ choose to reply, the "reply to" section of the E-mail should be capable of being resent to intermediate server I with coding enabling retransmission to non-subscribing sender John. The sender's user identifier sign @ is replaced with a delimiter—for example %—and a user identifier sign and the intermediate server domain name concatenated to the end of the non-subscribing sender J's address. Thus the "reply to" has the form (john02%university.edu@storagemail.com). This is achieved either manually or automatically by server I to message before it reaches the receiver.

Figure 2:
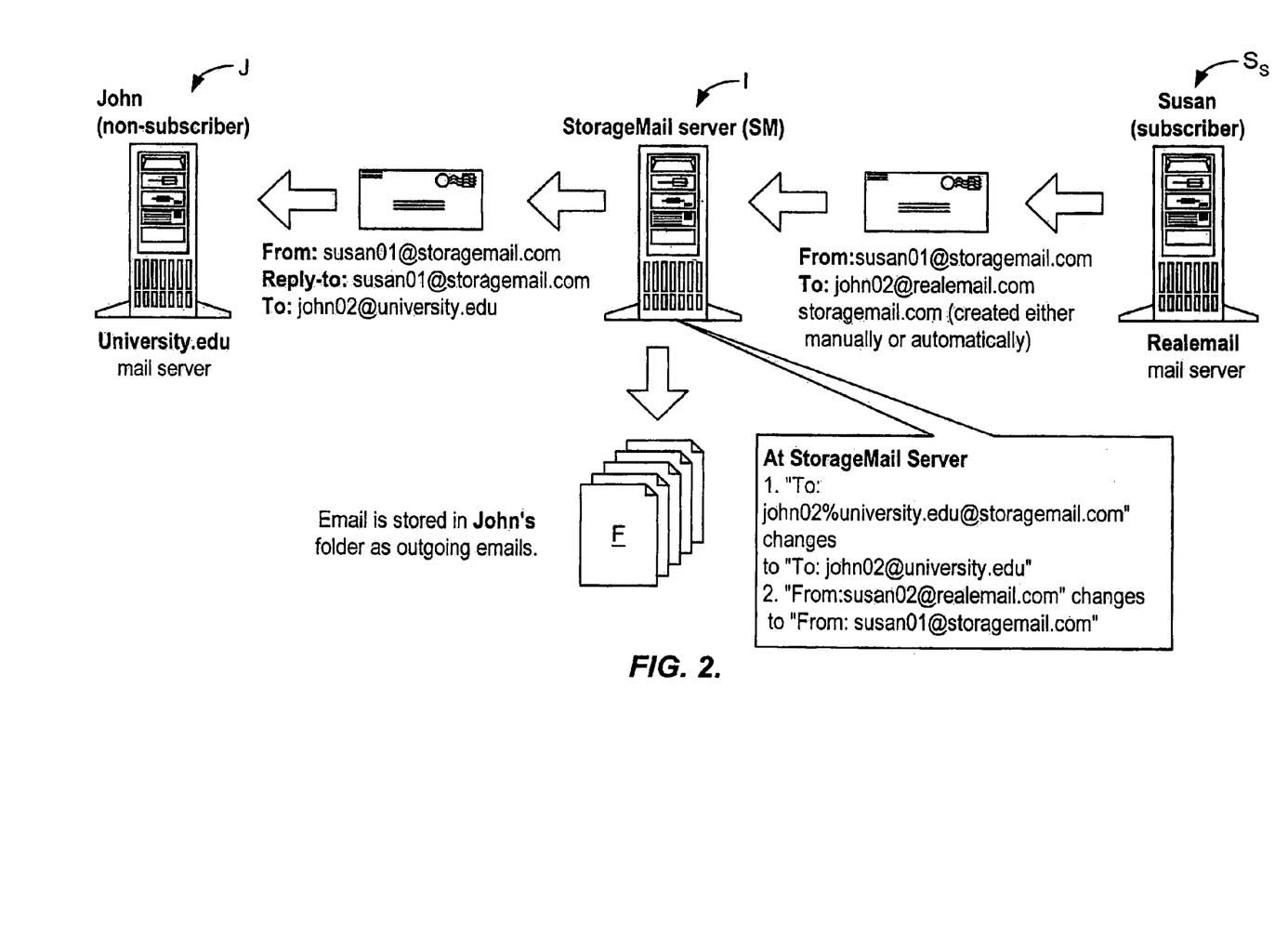
FIG. 2 is a schematic of the E-mail system wherein a subscribing sender sends an E-mail to a non-subscribing receiver through the intermediate server and the server alters both the "reply to" address and the sender's address upon transmission through the intermediate server to assure masking of the primary E-mail address of the subscribing sender.

Referring to FIG. 2, the case of subscribing sender $S_S$ sending a E-mail to non-subscribing receiver J can be understood. Subscribing sender $S_S$ sends codes in the message to non-subscribing receiver J in the format similar to the "reply to" format illustrated immediately above. This coding can be manual, software assisted, and/or automated by conventional programming.

Upon receipt at intermediate server I, the E-mail is resent. Two changes occur before resending is made.

First, the "To" portion of the message has the original address of non-subscribing receiver J restored by the replacement of the delimiter (e.g. %) with the user identifier sign @ and user identifier sign and the domain name of the intermediate server removed. The E-mail is capable of regular transmission to the non-subscribing receiver J.

Second, subscribing sender's primary E-mail address is removed and an assumed E-mail address is used therefor. Thus, non-subscribing receiver J will only see the sender's identity as "susan01@storagemail.com", the assumed E-mail address masking the primary E-mail address.

Reply occurs in the manner illustrated with respect to FIG. 1.

Figure 3:
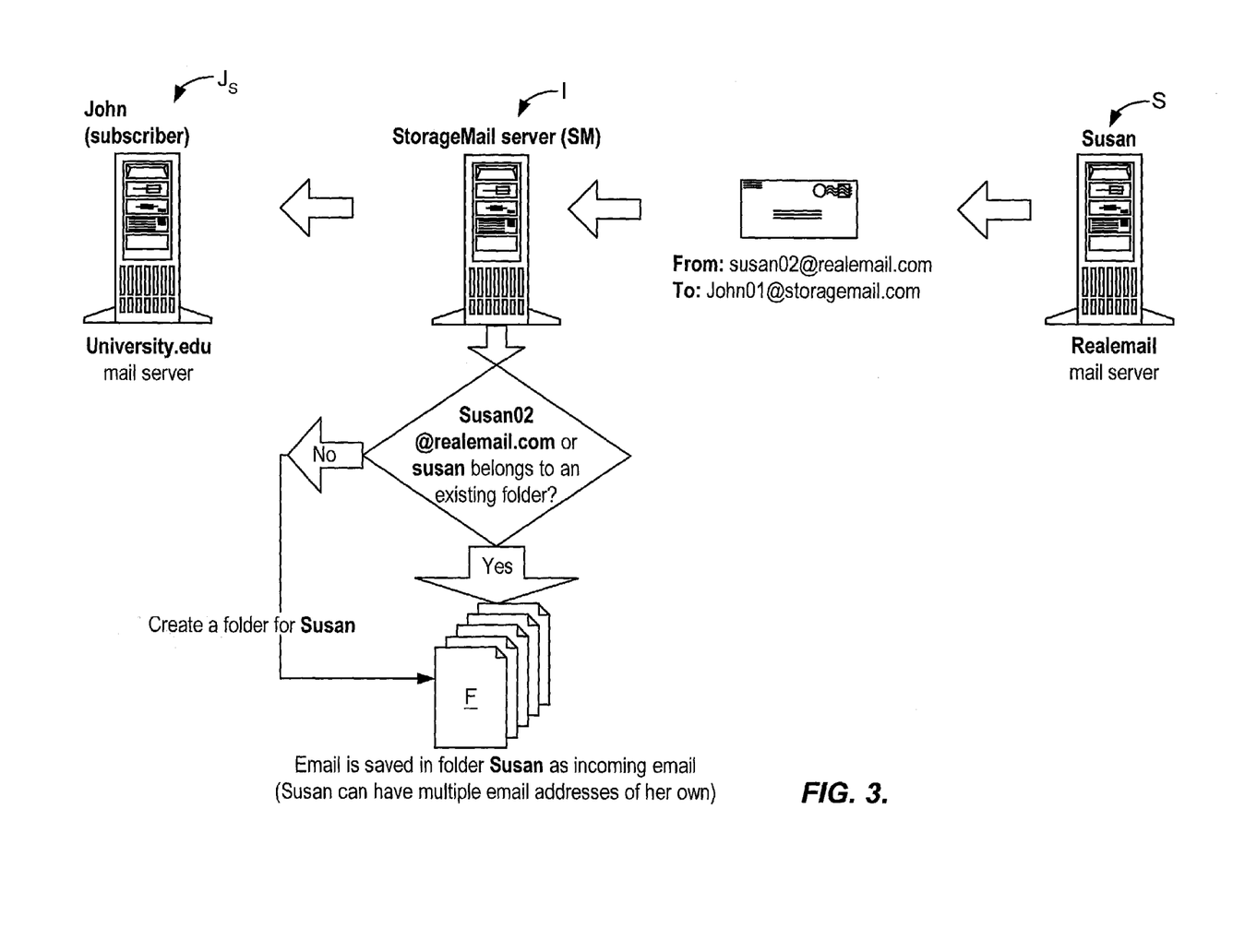
FIG. 3 is a schematic of smart archiving where a subscriber receives an E-mail from other user, either subscriber or non-subscriber; for the receiver, all the E-mails related to the same contact are saved in the same folder.
Figure 4:
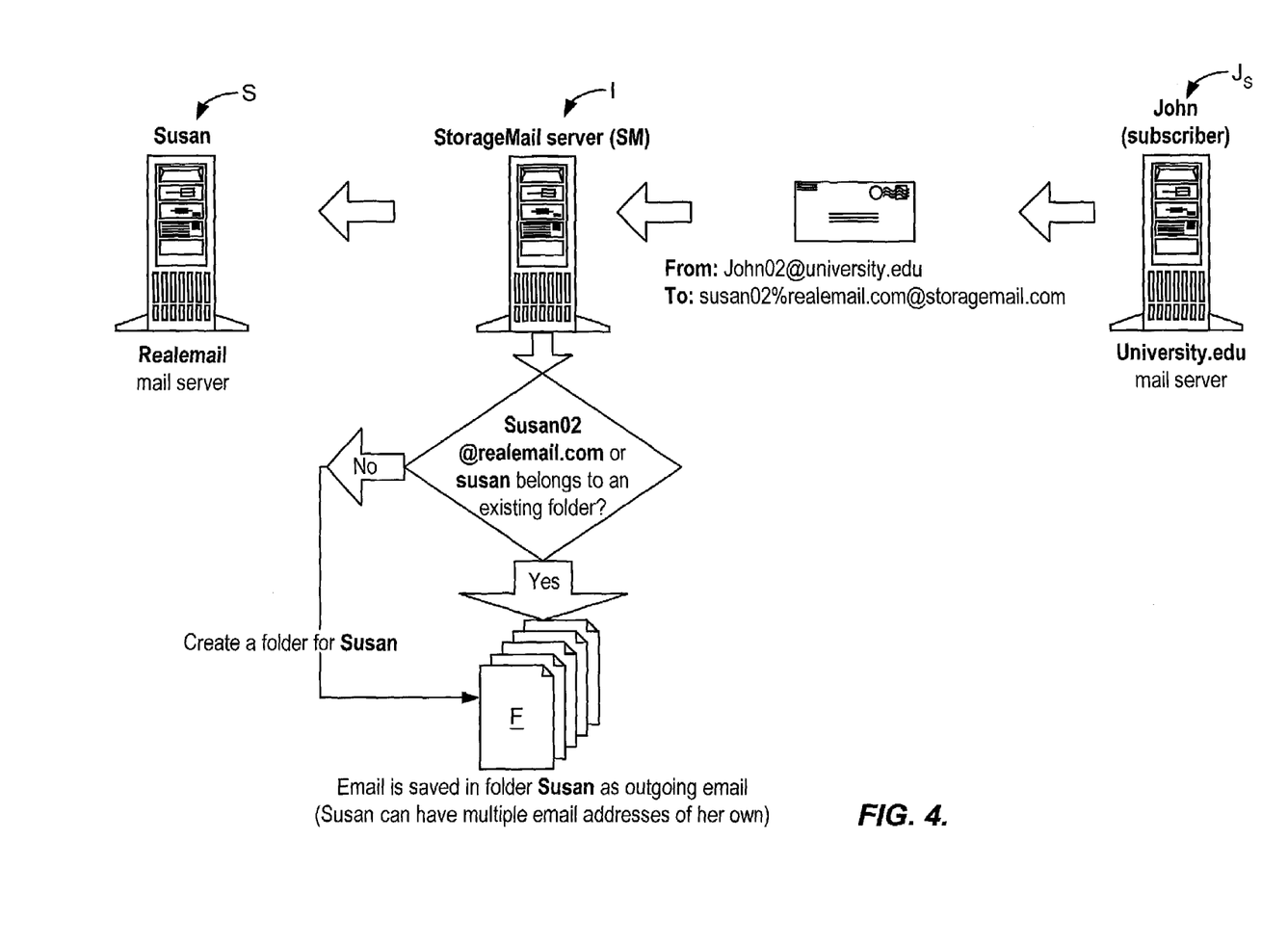
FIG. 4 is a schematic of smart archiving where a subscriber send an E-mail to other user; For the sender, all the E-mails related to the same contact are saved in the same folder.

FIGS. 3 and 4 illustrate the folder by party aspect of this invention. When a subscriber $J_S$ receives or sends an E-mail to any contact, conditional branch B occurs during retransmission of the E-mail interior of intermediate server I. Specifically, and for E-mails related to the same contact, the folders F is maintained. The folder contains—chronologically or other preferred orders—the correspondences to and from the same correspondent. Where a message is sent and or received from such a contact for the first time, a folder F is created. Thereafter, subsequent E-mails for the same contact are stored in that folder. All these are automatically archived.

Access to the folder can be easily understood. The reader will understand that the disclosed E-mail protocol set forth above does not require site logon. However, one access to folders by a subscriber is desired, logon is required. Thereafter, access to the folders compiled remotely by the intermediate server I can occur.

Figure 5:
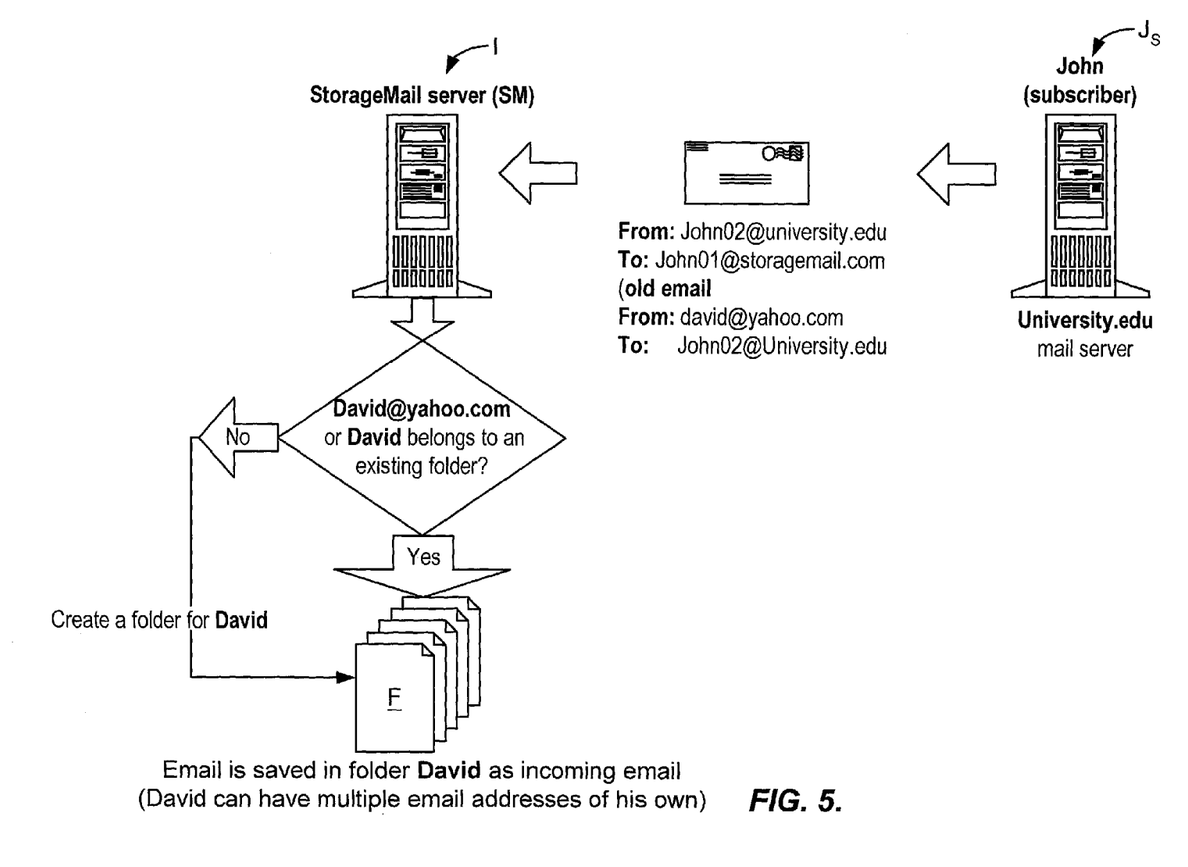
FIG. 5 illustrates a subscriber forwarding past or pre-subscription E-mails for smart archiving. System archives these E-mails as if subscriber just receives or sends E-mails except the intermediate server does not resend the message.

Finally, and with respect to FIG. 5, the system allows for the forwarding of past or pre-subscription E-mails. The forwarded E-mails are archived and directly accessed by the system and treated conventionally as set forth in FIGS. 3 and 4.

Figure 6:
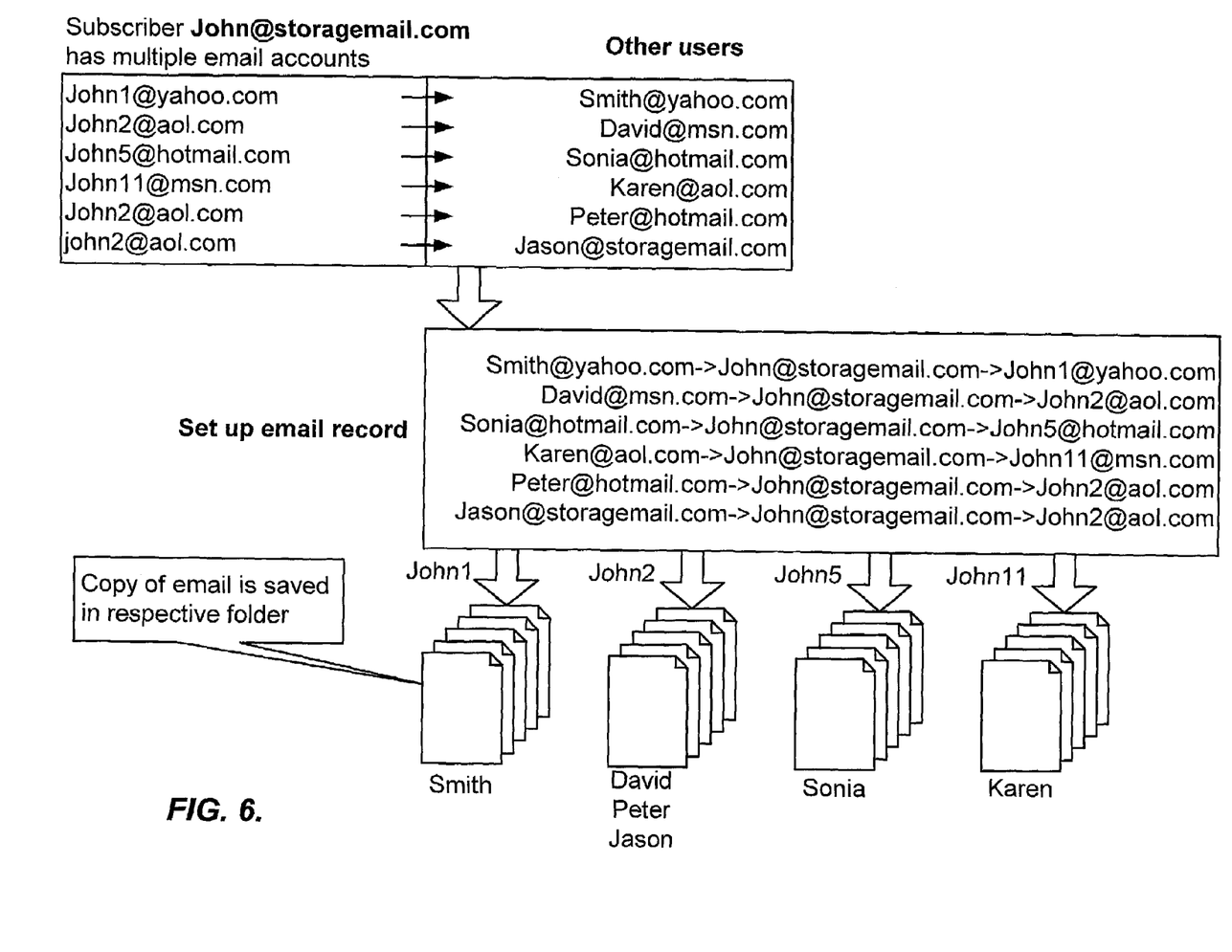
FIG. 6 is a schematic of smart archiving and E-mail system where a subscriber sends out E-mails from one of his multiple E-mail addresses and create the folder and record for the first time for the purpose of routing further incoming E-mails to the same primary E-mail address of his and archiving.
Figure 7:
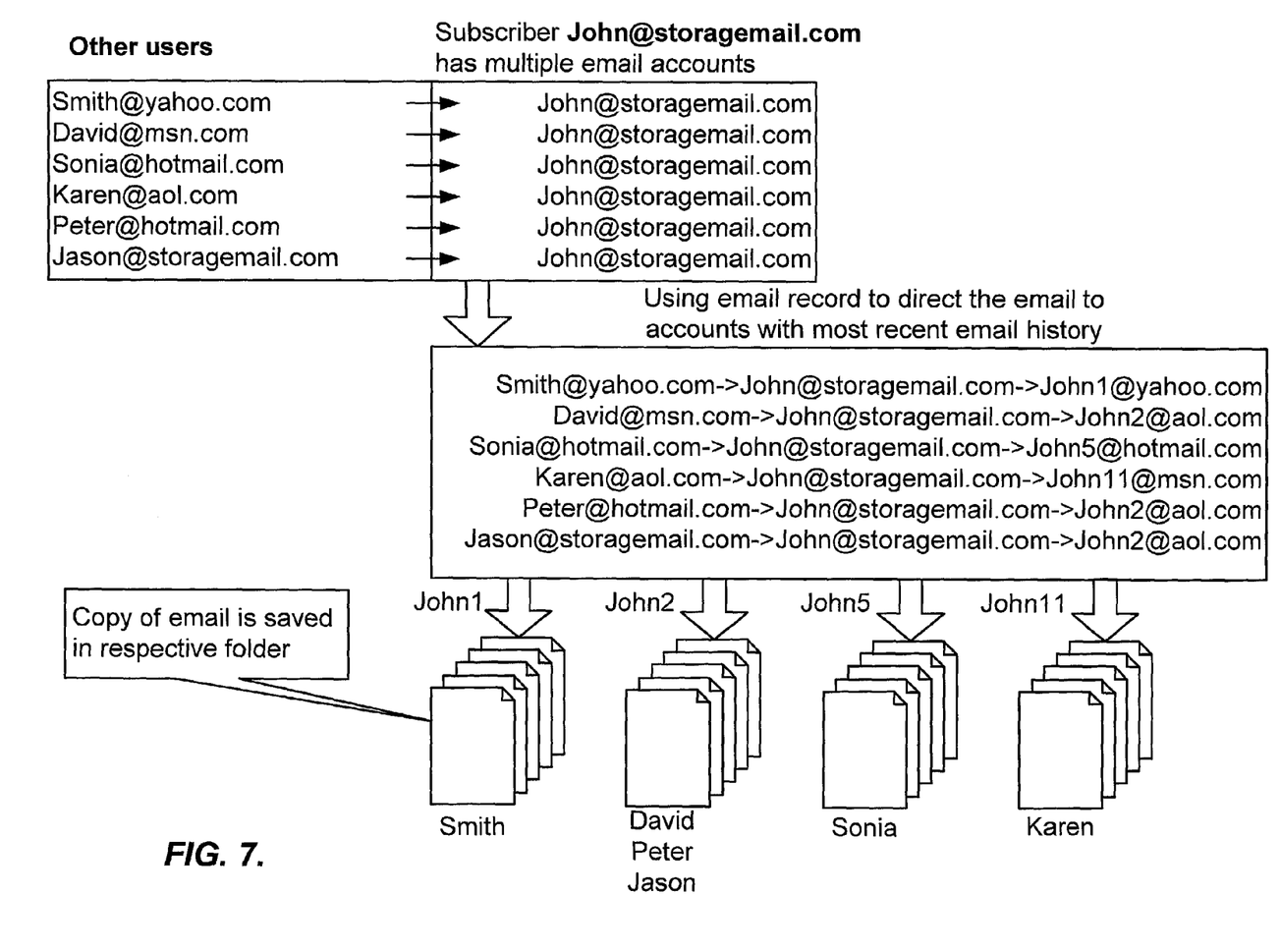
FIG. 7 is a schematic of smart archiving and E-mail system where a subscriber receives E-mails in his respective primary E-mail address according to the folders and records he set up previously, as described in FIG. 6.

FIGS. 6 and 7 illustrate the use of this protocol for a subscriber having multiple primary E-mail addresses. System subscriber creates a folder and record every time he sends a E-mail to a new receiver from one of his primary E-mail addresses. The further correspondences with the same address will be saved in the same folder and incoming E-mail forwarded to that specific primary E-mail address of subscriber's. Simply stated, each primary E-mail address is treated as a discrete subscriber with messages being encoded with "To", "Reply to", and "Reply" information as previously set forth with respect to FIGS. 1 and 2. Further, individual folder F is created and thereafter filled with chronologically order or other preferred orders messages as set forth in FIGS. 3 and 4.

What is claimed is:

1. In an E-mail process between subscribing sender and non-subscribing receiver, an intermediate server masks the primary E-mail address of the subscribing sender, the process comprising the steps of:
   providing an intermediate server with an intermediate server domain name;
   sending an E-mail message from the subscribing sender to the receiver with the address "To" format including a first "To" E-mail address including a user identifier, a user identifier sign, and the non-subscribing receiver's domain name;
   before sending concatenating a second delimiter and the intermediate server domain name to the end of the receiver's address to address the E-mail to the intermediate server to generate a second "To" E-mail address, wherein the second "To" E-mail address includes the user identifier and the non-subscribing receiver's domain name along with the second delimiter and the intermediate server domain name in a format such that the E-mail is sent to the intermediate server first instead of the first "To" E-mail address;
   upon receipt at the intermediate server resending the E-mail;
   before resending removing the sender's primary E-mail address whereby the intermediate server domain name becomes the domain name address of the sender; and
   before resending restoring the receiver's primary address by the removal of the delimiter and the domain name of the intermediate server;
   whereby masking of sender's primary E-mail address is assured.

2. In an E-mail process between subscribing sender and non-subscribing receiver, an intermediate server masks the primary E-mail address of the subscribing sender, the process according to claim 1 comprising the steps of:
   before sending concatenating a delimiter and the intermediate server domain name to the end of the receiver's address to address the E-mail to the intermediate server by replacing the receiver's user identifier sign with a second delimiter.

3. In an E-mail process between subscribing sender and non-subscribing receiver, an intermediate server masks the primary E-mail address of the subscribing sender, the process according to claim 1 comprising the steps of:
   automatically opening a folder for each new receiver in a database accessible to the subscribing sender using the intermediate server; and,
   automatically storing a copy of all messages in the database in the folder for each receiver accessible to the subscribing sender using the intermediate server.

4. In an E-mail process between subscribing sender and non-subscribing receiver, an intermediate server masks the primary E-mail address of the subscribing sender, according to claim 1 using the additional steps of:
   resending the reply from the intermediate server to the subscribing sender,
   before resending the reply from the intermediate server in the "Reply to" portion of the E-mail concatenating a delimiter and the intermediate server domain name to end of non-subscribing receiver's address;
   whereby reply from the non-subscribing receiver to the subscribing sender will pass through the intermediate server to assure masking of the primary E-mail address of the subscriber.

5. In an E-mail process between subscribing sender and non-subscribing receiver, an intermediate server masks the primary E-mail address of the subscribing sender, according to claim 4 using the additional steps of:
   before resending the reply from the intermediate server in the "Reply to" portion of the E-mail concatenating a delimiter and the intermediate server domain name to end of non-subscribing receiver's address by replacing a receiver's user identifier sign in the subscribing receiver's address with a delimiter.

6. In an E-mail process between subscribing sender and non-subscribing receiver, an intermediate server masks the primary E-mail address of the subscribing sender, the process according to claim 1 comprising the additional steps of:
   before sending to the intermediate server replacing the user identifier sign in the receiver's address with a third delimiter; and
   before resending replacing said third delimiter with the user identifier sign.

7. The process of claim 6, wherein the user identifier sign is the "@" symbol.

8. In an E-mail process between non-subscribing sender and subscribing receiver, an intermediate server masks the primary E-mail address of the subscribing receiver, the process comprising the steps of:
   providing an intermediate server with an intermediate server domain name;
   sending an E-mail message form the non-subscribing sender with the format including a receiver identifier, a first delimiter, and intermediate server domain name to address the E-mail to the receiver at the intermediate server;
   upon receipt at the intermediate server resending the E-mail to the subscribing receiver;
   before resending concatenating in the "Reply to" portion of the E-mail a second delimiter and the intermediate server domain name to the end of a first "Reply to" sender E-mail address, which includes a sender identifier, a sender's user identifier sign, and a sender domain name, to generate a second "Reply to" E-mail address, wherein the second "Reply to" E-mail address includes the sender identifier and the sender domain name along with the second delimiter and the intermediate server domain name in a format such that a reply E-mail is sent to the intermediate server first instead of the first "Reply to" sender E-mail address; and before resending, removing the subscribing receiver's assumed E-mail address and using the subscribing receiver's primary E-mail address substituted therefore;

whereby "Reply to" the receiver is assured through the intermediate server to masks the primary E-mail address of the subscribing receiver in the event of sending a reply later.

9. In an E-mail process between non-subscribing sender and subscribing receiver, an intermediate server masks the primary E-mail address of the subscribing receiver, the process according to claim 8 comprising the steps of:

automatically opening a folder for each new sender in a database accessible to the subscribing receiver using the intermediate server; and, automatically storing a copy of all messages in the database in the folder for each sender accessible to the subscribing receiver using the intermediate server.

10. In an E-mail process between non-subscribing sender and subscribing receiver, an intermediate server masks the primary E-mail address of the subscribing receiver, the process according to claim 8 comprising the additional step of;

before resending replacing the user identifier sign in the non-subscribing sender's address in the "Reply-to" portion of the email with another delimiter.

* * * * *